(12) United States Patent
Krause et al.

(10) Patent No.: US 9,582,819 B2
(45) Date of Patent: Feb. 28, 2017

(54) AUTOMATED-VALUATION-MODEL TRAINING-DATA OPTIMIZATION SYSTEMS AND METHODS

(71) Applicant: GREENFIELD ADVISORS, LLC, Seattle, WA (US)

(72) Inventors: Andy Krause, Seattle, WA (US); Clifford A. Lipscomb, Cartersville, GA (US); John A. Kilpatrick, Issaquah, WA (US)

(73) Assignee: GREENFIELD ADVISORS, LLC, Seattle, WA (US)

( * ) Notice: Subject to any disclaimer, the term of this patent is extended or adjusted under 35 U.S.C. 154(b) by 745 days.

(21) Appl. No.: 14/038,627

(22) Filed: Sep. 26, 2013

(65) Prior Publication Data
US 2015/0088766 A1    Mar. 26, 2015

(51) Int. Cl.
*G06Q 30/02*    (2012.01)
*G06Q 50/16*    (2012.01)

(52) U.S. Cl.
CPC .......... *G06Q 30/0278* (2013.01); *G06Q 50/16* (2013.01)

(58) Field of Classification Search
None
See application file for complete search history.

(56) References Cited

U.S. PATENT DOCUMENTS

| | | | | |
|---|---|---|---|---|
| 2004/0243450 A1* | 12/2004 | Bernard, Jr. | ........... | G06Q 40/02 705/4 |
| 2006/0015357 A1* | 1/2006 | Cagan | ................ | G06Q 30/0278 705/306 |
| 2010/0318451 A1* | 12/2010 | Niccolini | ........... | G06Q 30/0278 705/35 |
| 2012/0330719 A1* | 12/2012 | Malaviya | ............... | G06Q 30/02 705/7.31 |
| 2013/0290195 A1* | 10/2013 | Frazier | ............... | G06Q 30/0278 705/306 |
| 2014/0164260 A1* | 6/2014 | Spieckerman | ..... | G06Q 30/0278 705/306 |

* cited by examiner

*Primary Examiner* — Alan Chen
(74) *Attorney, Agent, or Firm* — AEON Law; Adam L. K. Philipp

(57) ABSTRACT

To optimize training data used by a predictive real-estate valuation model, a search space having multiple dimensions may be defined. Each search dimension corresponds to a range of candidate values for a search criterion for selecting subsets of sales-transaction records. The multiple dimensions include a temporal dimension and a geographic dimension. An accuracy-optimized subset of a multiplicity of sales-transaction records is identified by evaluating points that vary along each dimension within the multi-dimension search space. A statistical measure of model accuracy is used to evaluate each candidate point. The accuracy-optimized subset of the multiplicity of sales-transaction records is provided to a predictive model to generate an automated value prediction for a subject real-estate property as of an effective date.

18 Claims, 6 Drawing Sheets

AUTOMATED-VALUATION-MODEL TRAINING-DATA OPTIMIZATION SYSTEMS AND METHODS

FIELD

This disclosure is directed to the field of software, and more particularly, to optimizing training data used by a predictive model for automatically valuing a subject real-estate property.

BACKGROUND

Automated valuation model ("AVM") services provide real estate property value predictions using a mathematical predictive model and a set of "training data" describing values of other properties, typically including sales data from recent property sales within a geographic region. Some AVM services also take into account previous surveyor and/or assessor valuations, historical house price movements, user inputs (e.g., number of bedrooms, property improvements, etc.) and the like.

In many cases, the accuracy of a given predictive model may depend to a large extent on the training data provided for use by the model. Typically, training data is selected from a database containing a very large number of records describing real-estate property sales across a large region, such as a country, state, county, or the like, and across a large period of time, such as many years.

Previously known methods for performing automated valuations in general, and more particularly for selecting a set of training data for a subject real-estate property are described in U.S. Pat. No. 5,361,201, which is hereby incorporated by reference, for all purposes. Such previously known methods include establishing a fixed period of time (e.g. from zero to two years prior to an effective date) and expanding or contracting a geographic boundary until a desired count of sales records are selected.

For example, to select training data according to a previously known method, a sales-transaction database may be queried to identify sales-transaction records corresponding to real-estate property sales that took place within two years prior to an effective date and within a geographic search radius of (for example) one km of a subject real-estate property. Those records are counted, and if the count is below a predetermined threshold (e.g., 100 sales transactions), the geographic search radius may be iteratively increased until the count reaches the predetermined threshold.

However, merely targeting a predetermined count of sales transactions may not result in the selection of an optimal set of training data. Consequently, there is a need for an improved method of selecting training data to provide more accurate value predictions.

DESCRIPTION

Figure 1:
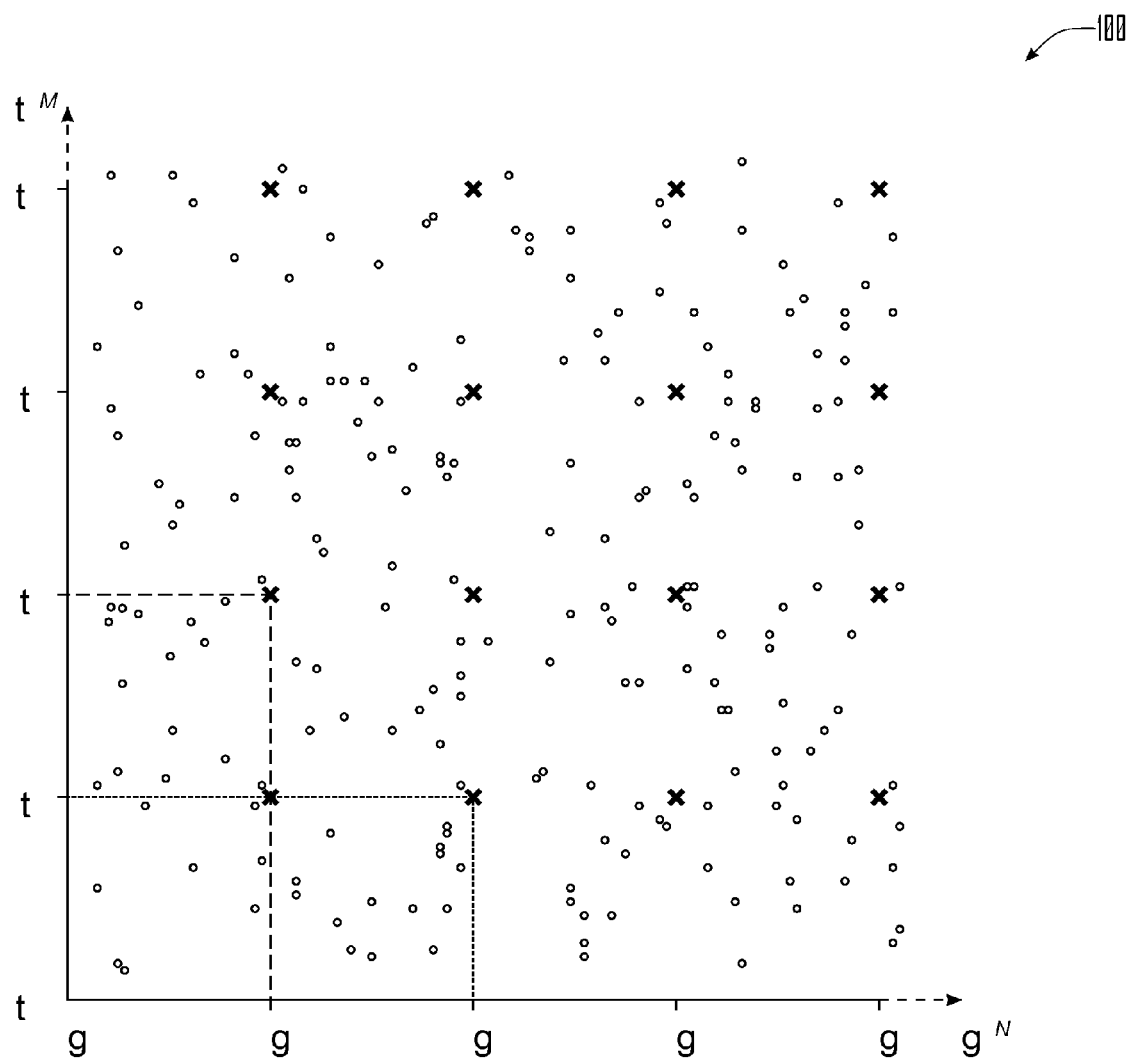
FIG. 1 illustrates a search-space visualization having two search dimensions, in accordance with one embodiment.

In various embodiments, to optimize training data used by a predictive model for automatically valuing a subject real-estate property, a search space having multiple dimensions may be defined. Each search dimension may correspond to a range of candidate values for a search criterion for selecting subsets of a multiplicity of sales-transaction records. The multiple dimensions may include not only a geographic dimension that measures distance in space away from a subject real-estate property, but also a temporal dimension that measures distance in time before an effective date. Some embodiments may include additional dimensions. An optimized subset of the multiplicity of sales-transaction records is identified by evaluating a multiplicity of points that vary along at least the temporal dimension and the geographic dimension within the multi-dimension search space. A statistical measure of model accuracy is used to evaluate each candidate point. The optimized subset of the multiplicity of sales-transaction records is provided to the predictive model to generate an automated value prediction for the subject real-estate property as of the effective date.

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates a search-space visualization 100 having two search dimensions, in accordance with one embodiment. In the illustrated example, search-space visualization 100 includes two search dimensions, g and t. Points within search-space visualization 100 are denoted with 'x' marks, and sales-transaction records are denoted with open circles. Typically, these and many other sales-transaction records may be stored in sales-transaction records database 645 (see FIG. 6, discussed below), which can be queried according to various search criteria to locate various subsets of sales-transaction records.

Each sales-transaction record is associated with metadata corresponding to each search dimension and can be selected using search criteria corresponding to each search dimension. For example, in one embodiment, each sales-transaction record may be associated with geographic metadata such as latitude and longitude values or other values within a geographic coordinate system, and each sales-transaction record may also be associated with temporal metadata such as a date and/or timestamp.

Search dimension g is a geographic dimension that measures distance in space away from a subject real-estate property, which is conceptually positioned within search-space visualization 100 at $g^{+0}$. Several candidate geographic-distance values ($g^{+1}$, $g^{+2}$, etc.) are illustrated. In search-space visualization 100, the candidate geographic-distance values are sampled from a geographic range from $g^{+0}$-$g^{+M}$. For example, in one embodiment, $g^{+0}$ may correspond to the geographic location of the subject real-estate property, while $g^{+M}$ may correspond to geographic radius of 25 miles (for example) away from the subject real-estate property. In such an embodiment, candidate geographic-distance values may be obtained by sampling that 25-mile range with a period of 'X' miles. For example, sampling the 25-mile range with a period of one mile would yield a $g^{+1}$ candidate geographic-distance value corresponding to a geographic radius of one mile away from the subject real-estate property, a $g^{+2}$ candidate geographic-distance value corresponding to two miles away from the subject real-estate property, and so on.

In other embodiments, the outer limit of a geographic range may be determined according to an arbitrary boundary, such as a county or state line, while candidate geographic-distance values within that outer boundary may be determined according to other arbitrary boundaries of differing sizes. For example, in one embodiment, a $g^{+1}$ candidate geographic-distance value may correspond to a city block boundary, a $g^{+2}$ candidate geographic-distance value may correspond to a neighborhood or postal-code boundary, a $g^{+3}$ candidate geographic-distance value may correspond to a city or town boundary, and so on.

Similarly, search dimension t is a temporal dimension that measures distance in time before an effective date, which is conceptually positioned within search-space visualization 100 at $t^{-0}$. Several candidate temporal-distance values ($t^{-1}$, $t^{-2}$, etc.) are illustrated. In search-space visualization 100, the candidate temporal-distance values are sampled from a temporal range from $t^{-0}$-$t^{-N}$. For example, in one embodiment, $t^{-0}$ may correspond to the effective date, while $t^{-N}$ may correspond to a date two years (for example) prior to the effective date. In such an embodiment, candidate temporal-distance values may be obtained by sampling that two-year range with a period of 'X' weeks or months. For example, sampling the two-year range with a period of one month would yield a $t^{-1}$ candidate temporal-distance value corresponding to one month before the effective date, a $t^{-2}$ candidate temporal-distance value corresponding to two months before the effective date, and so on.

As illustrated in search-space visualization 100, the search space includes several points, illustrated by 'x' marks, where candidate values along search dimensions g and t intersect. For example, points are illustrated at ($g^{+1}$, $t^{-1}$), ($g^{+2}$, $t^{-1}$), ($g^{+1}$, $t^{-2}$), and the like. Thus, each point within the search space corresponds to a combination of candidate values along each search dimension.

In various embodiments, a multi-dimension search criteria set may be derived from each point within the search space. For example, if $g^{+2}$ corresponds to a 2-mile geographic radius around the subject real-estate property, and if $t^{-1}$ corresponds to a time period within one month before the effective date, then point ($g^{+2}$, $t^{-1}$) may correspond to a multi-dimension search criteria set for selecting a subset of sales-transaction records from sales-transaction records database 645 where a sales-transaction record is associated with geolocation metadata having a value positioning a transaction within a geographic distance of two miles of the subject real-estate property and with temporal metadata positioning a transaction within a temporal distance of one month of the effective date.

As discussed above, previously known methods for selecting training data simply adjust geographic search boundaries until a desired count of sales-transaction records are identified. However, as shown in search-space visualization 100, point ($g^{+2}$, $t^{-3}$) and point ($g^{+1}$, $t^{-2}$) correspond to different subsets (indicated by dashed lines) that happen to have the same count of sales-transaction records.

In many cases, one of those subsets of sales-transaction records may be used to develop a more accurate predictive model than the other, notwithstanding that the two subsets have the same count of sales-transaction records. Discussed herein are systems and methods for selecting accuracy-optimized subsets of sales-transaction records for developing predictive models.

Figure 2:
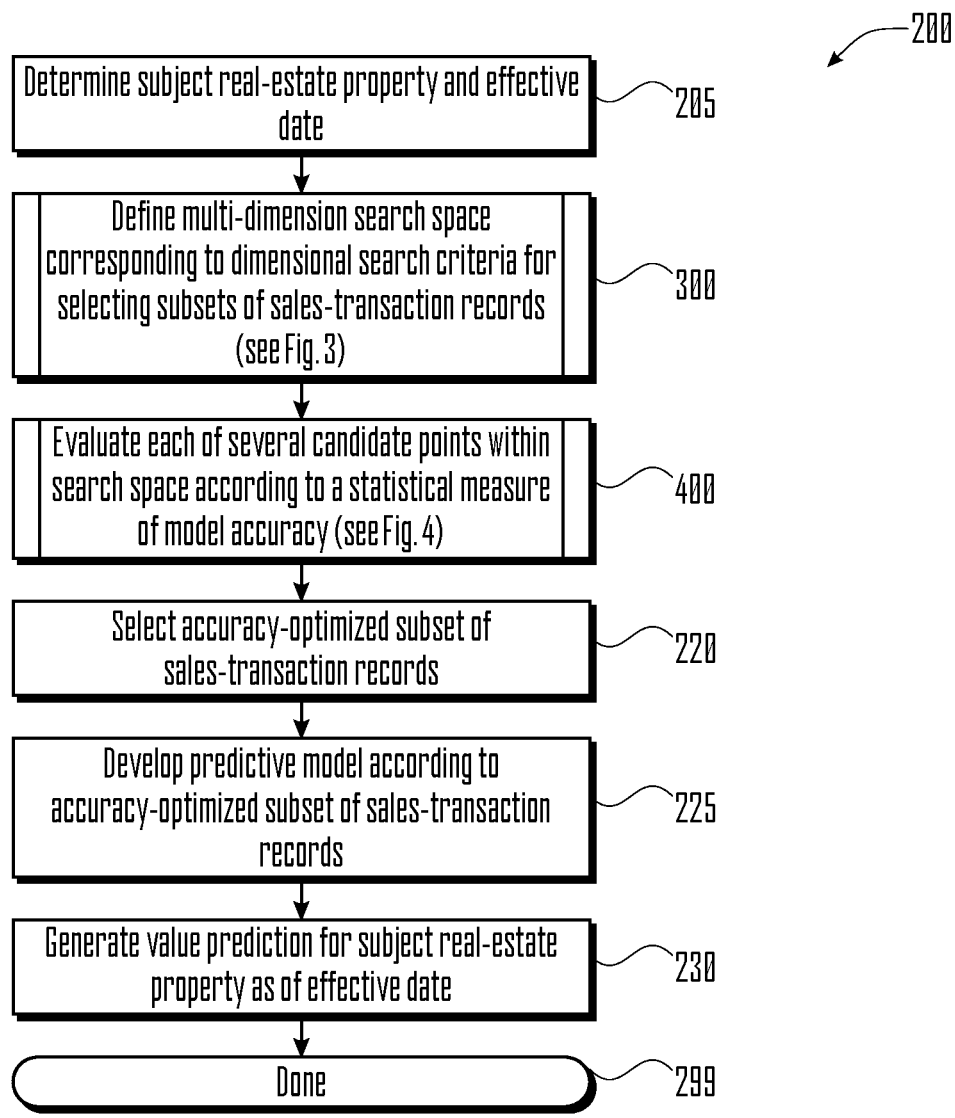
FIG. 2 illustrates a routine for optimizing training data for developing a predictive model to automatically value a subject real-estate property, such as may be performed by a training-data-optimization server in accordance with one embodiment.

FIG. 2 illustrates a routine 200 for optimizing training data for developing a predictive model to automatically value a subject real-estate property, such as may be performed by a training-data-optimization server 600 in accordance with one embodiment.

In block 205, routine 200 obtains an indication indicating a subject real-estate property and an effective date. Typically, such an indication includes metadata corresponding to the subject real-estate property and the effective date. In various embodiments, such metadata includes at least geographic metadata such as latitude and longitude values or other values within a geographic coordinate system, as well as temporal metadata such as a date and/or timestamp.

In subroutine block 300, routine 200 calls subroutine 300 (see FIG. 3, discussed below) to define a multi-dimension search space, such as that visualized in search-space visualization 100 (see FIG. 1, discussed above), that corresponds to two or more dimensional search criteria for selecting subsets of sales-transaction records.

In subroutine block 400, routine 200 calls subroutine 400 (see FIG. 4, discussed below) to evaluate each of several points within the multi-dimension search space according to a statistical measure of model accuracy.

Based at least in part on the candidate-point evaluations performed in subroutine block 400, in block 220, routine 200 selects an accuracy-optimized subset of sales-transaction records. For example, in one embodiment, in subroutine block 400, routine 200 may have identified an optimized multi-dimension search criteria set that may be used to query and select a subset of sales-transaction records from sales-transaction records database 645.

In block 225, routine 200 develops a predictive model according to the accuracy-optimized subset of sales-transaction records selected in block 220. For example, in one embodiment, routine 200 may provide the accuracy-optimized subset of sales-transaction records to predictive model 630 (see FIG. 6, discussed below) as training data. In some embodiments, developing the predictive model may also include providing additional data such as some or all of previous surveyor and/or assessor valuations, historical house price movements, user inputs (e.g., number of bedrooms, property improvements, etc.), and the like.

In block 230, routine 200 using the predictive model developed in block 225, in block 230, routine 200 generates an automated value prediction for the subject real-estate property as of the effective date.

Routine 200 ends in ending block 299.

Figure 3:
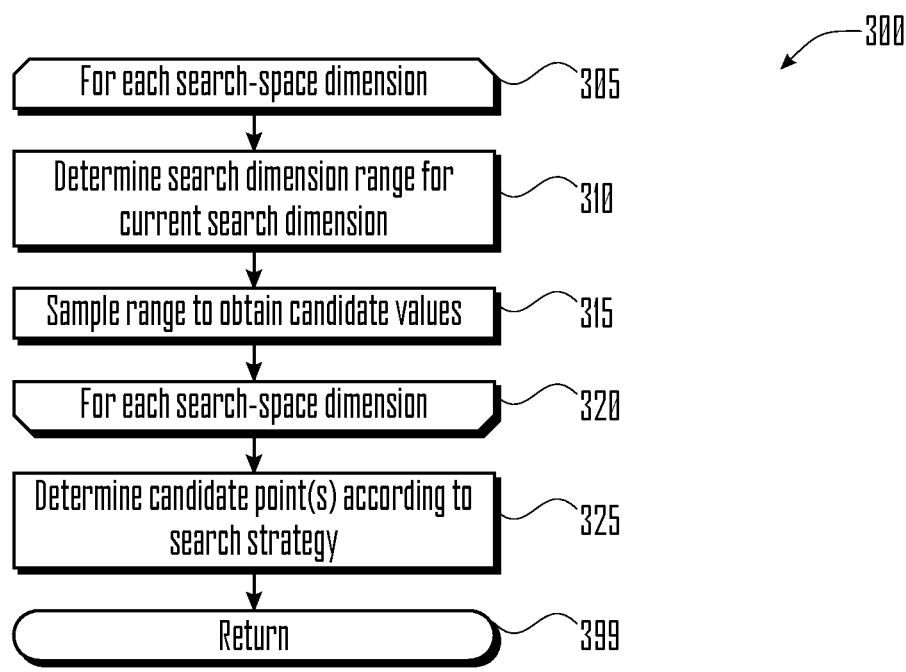
FIG. 3 illustrates a subroutine for defining a multi-dimension search space for a given subject real-estate property and a given effective date, such as may be performed by a training-data-optimization server in accordance with one embodiment.

FIG. 3 illustrates a subroutine 300 for defining a multi-dimension search space for a given subject real-estate property and a given effective date, such as may be performed by a training-data-optimization server 600 in accordance with one embodiment.

As illustrated in FIG. 1, the multi-dimension search space has at least a geographic dimension (g) and a temporal dimension (t).

Beginning in opening loop block 305, subroutine 300 processes each search dimension in turn.

In block 310, subroutine 300 determines a range for the current search dimension within which sales-transaction records may be located that may be useful for developing a predictive model to predict a valuation for the given subject real-estate property as of the given effective date. For example, when processing a temporal dimension, subroutine 300 may determine a temporal range of 0-12 months, 0-24 months, or the like. Similarly, when processing a geographic dimension, subroutine 300 may determine a geographic range that extends for a predetermined search radius (e.g., 25 miles) from the given subject real-estate property. In other embodiments, subroutine 300 may determine a geographic range that extends from the given subject real-estate property to an arbitrary boundary, such as a county or state line.

In block 315, subroutine 300 samples the range determined in block 310 to obtain several candidate values. For example, in one embodiment, subroutine 300 may be configured to sample a predetermined count of values within the range, such as by sampling 10, 20, or more values within the range. In some embodiments, the sampled values may be distributed evenly throughout the range, but other embodiments may sample values that are not evenly distributed.

In other embodiments, subroutine 300 may be configured to sample an undetermined count of values that are of a predetermined size, such as by sampling a geographic range such that each successive search-radius value is N kilometers larger than the previous value.

In still other embodiments, subroutine 300 may be configured to use an arbitrary sampling of values for a given search dimension. For example, in one embodiment, subroutine 300 may be configured to sample a temporal range of 24 months to obtain a predetermined set of candidate values, such as {1 month, 2 months, 3 months, 6 months, 12 months, 18 months, 24 months}.

Other embodiments may employ other sampling schemes.

In ending loop block 320, subroutine 300 iterates back to opening loop block 305 to process the next search dimension, if any.

In block 325, subroutine 300 determines at least a starting candidate point to be subsequently evaluated for model accuracy.

As shown in search-space visualization 100 (see FIG. 1, discussed above), a multi-dimension search space may include many candidate points. In various embodiments, various search strategies may be employed to identify an optimized point. For example, in one embodiment, a "brute force" search, exhaustive search, and or other iterative search may be employed to evaluate each point within the search space. In such embodiments, each point within the search space may be selected for subsequent evaluation.

In other embodiments, various metaheuristic search strategies that are commonly used to solve global optimization problems may be employed to select evaluation points, such as a simulated annealing technique, a genetic algorithm, a stochastic optimization technique, a particle swarm optimization technique, or the like. In such embodiments, a starting candidate point may be determined.

Depending on the search strategy to be employed, in block 325, subroutine 300 determines several candidate points, or at least a starting point, to be subsequently evaluated for model accuracy, as discussed further below.

Subroutine 300 ends in ending block 399, returning to the caller.

Figure 4:
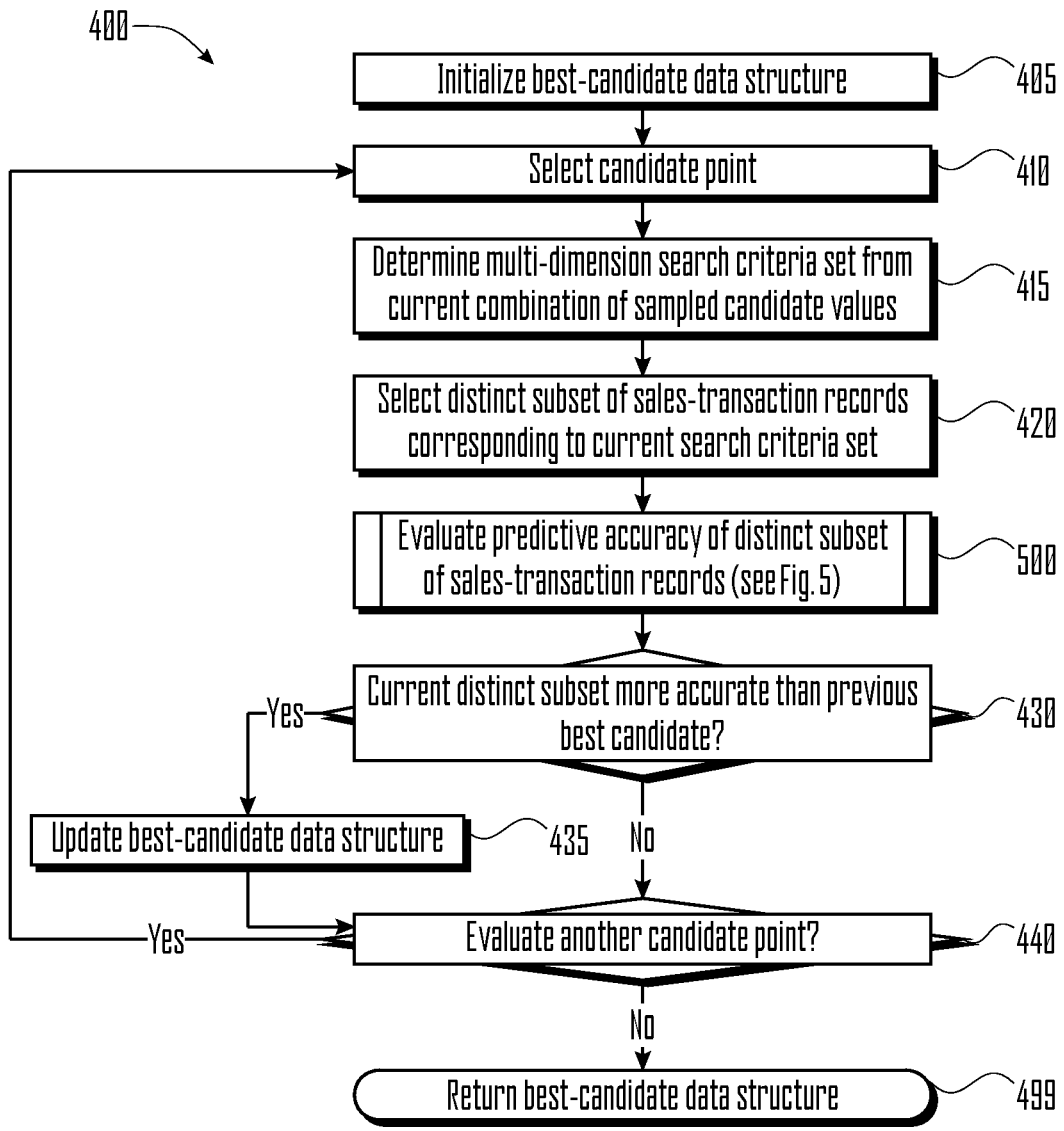
FIG. 4 illustrates a subroutine for evaluating a given point within a multi-dimension search space according to a statistical measure of model accuracy, such as may be performed by a training-data-optimization server in accordance with one embodiment.

FIG. 4 illustrates a subroutine 400 for evaluating a given point within a multi-dimension search space according to a statistical measure of model accuracy, such as may be performed by a training-data-optimization server 600 in accordance with one embodiment.

In block 405, subroutine 400 initializes a data structure for storing, at least transiently, information related to an accuracy-optimized candidate point, as discussed below.

In block 410, subroutine 400 selects a candidate point representing a dimensional combination of sampled candidate values. As discussed above, in various embodiments, various search strategies may be employed to identify an accuracy-optimized candidate point. The process used by subroutine 400 in block 410 to select a candidate point may vary based on search strategy. For example, if an exhaustive search strategy is employed, then in block 410, subroutine 400 may simply select the first unevaluated point from a list of points within a search space, as described in connection with block 325 (see FIG. 3, discussed above).

In other embodiments, if a metaheuristic search strategy is employed, then selecting a candidate point may include randomly or deterministically altering a value along one or more search dimensions of a previously selected candidate point.

In block 415, subroutine 400 determines a multi-dimension search criteria set from the combination of sampled candidate values that is associated with the candidate point selected in the current iteration of block 410. One example of deriving a multi-dimension search criteria set from a point within the search space is illustrated in search-space visualization 100 (see FIG. 1, discussed above).

In block 420, subroutine 400 selects from sales-transaction records database 645 (see FIG. 6, discussed below) a distinct subset of sales-transaction records corresponding to the multi-dimension search criteria set determined in block 415. For example, according to the example illustrated in FIG. 1, if the currently selected candidate point were ($g^{+2}$, $t^{-1}$), then in block 420, subroutine 400 may select a distinct subset of sales-transaction records corresponding to the open circles within the finely-dashed lines shown in search-space visualization 100.

In subroutine block 500, subroutine 400 calls subroutine 500 (see FIG. 5, discussed below) to statistically evaluate the predictive accuracy of the distinct subset of sales-transaction records, which were selected in block 420, when those sales-transaction records are used to train and/or develop predictive model 630 (see FIG. 6, discussed below).

In decision block 430, subroutine 400 determines whether the current distinct subset provides a greater predictive accuracy than the previous best candidate (if any). If so, subroutine 400 proceeds to block 435. Otherwise, subroutine 400 proceeds to decision block 440.

In block 435, subroutine 400 updates the best-candidate data structure that was initialized in block 405 according to some or all of the multi-dimension search criteria set determined in block 415, the distinct subset of sales-transaction records selected in block 420, and/or the statistical accuracy measured in subroutine block 500.

In decision block 440, subroutine 400 determines whether to continue by evaluating another candidate point. If so, subroutine 400 proceeds to block 410. Otherwise, subroutine 400 proceeds to ending block 499.

As discussed above, in various embodiments, various search strategies may be employed to identify an accuracy-optimized candidate point. The process used by subroutine 400 in decision block 440 to determine whether to evaluate another candidate point may vary based on search strategy.

For example, if an exhaustive search strategy is employed, then in decision block 440, subroutine 400 may determine to evaluate another point unless all candidate points have already been evaluated.

In other embodiments, if a metaheuristic search strategy is employed, then in decision block 440, subroutine 400 may use one or more search-strategy-specific factors to determine whether to continue. For example, in various embodiments, subroutine 400 may consider factors such as how many candidate points have already been evaluated, whether the best-candidate found so far meets a predetermined accuracy threshold, a degree of variance in recent candidate evaluations, and the like.

Subroutine 400 ends in ending block 499, returning best-candidate data structure to the caller.

Figure 5:
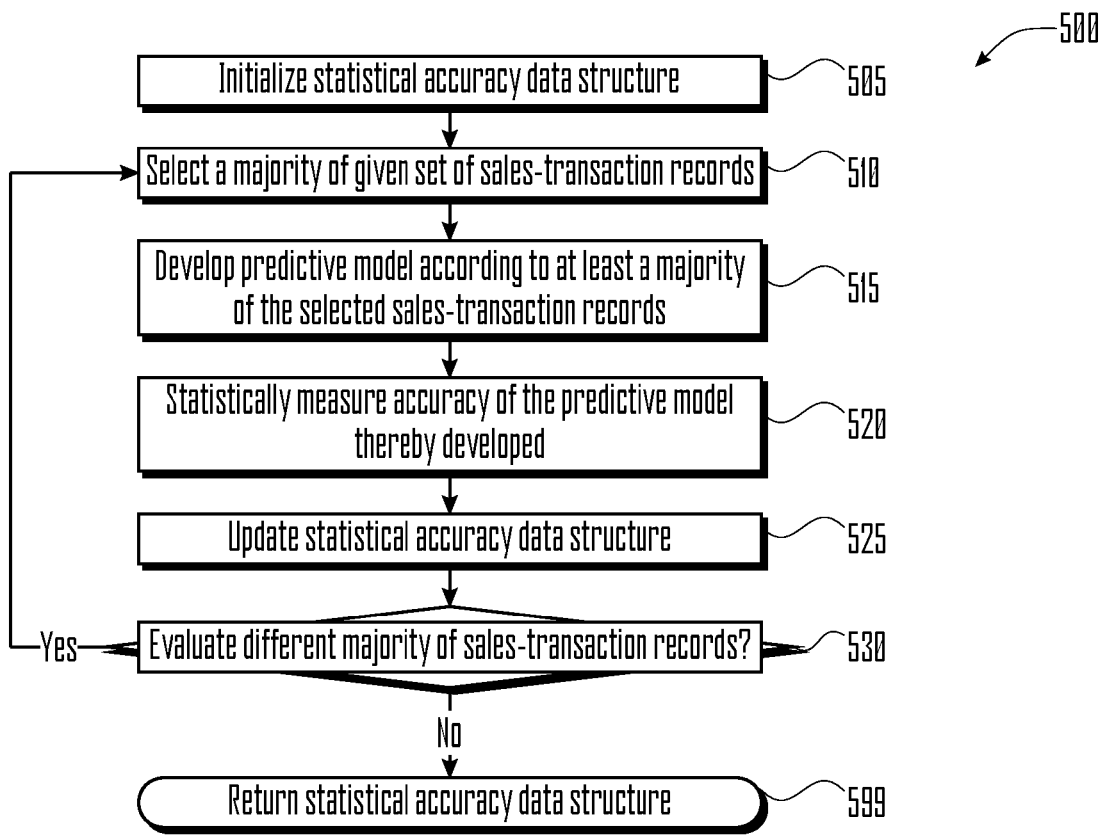
FIG. 5 illustrates a subroutine for statistically measuring the accuracy of a predictive model developed according to a given set of sales-transaction records, such as may be performed by a training-data-optimization server in accordance with one embodiment.

FIG. 5 illustrates a subroutine 500 for statistically measuring the accuracy of a predictive model developed according to a given set of sales-transaction records, such as may be performed by a training-data-optimization server 600 in accordance with one embodiment.

In block 505, subroutine 500 initializes a data structure for storing, at least transiently, information related to a statistical accuracy of a predictive model developed according to the given set of sales-transaction records.

In block 510, subroutine 500 selects at least a majority of sales-transaction records from the given set of sales-transaction records. For example, in one embodiment, subroutine 500 may select a predetermined count of sales-transaction records from the distinct subset (e.g., 90% of the sales-transaction records in the distinct subset).

In block 515, subroutine 500 develops predictive model 630 (see FIG. 6, discussed below) according to the majority of sales-transaction records selected in block 510.

In block 520, subroutine 500 statistically measures an accuracy of the predictive model developed in block 515 using a statistical measure of model accuracy. For example, in one embodiment, a predetermined count of sales-transaction records that were not used in block 515 to develop the predictive model (e.g., the remaining 10%) may be used as references to measure predictions provided by the predictive model developed in block 515.

In various embodiments the statistical measure of model accuracy may include a forecast standard deviation statistical measure, a mean average percent error statistical measure, a mean absolute error statistical measure, a root mean square error statistical measure, or the like.

In block 525, subroutine 500 updates the statistical accuracy data structure initialized in block 505 according to the measurement obtained in block 520.

In decision block 530, subroutine 500 determines whether to continue evaluating the accuracy of the given set of sales-transaction records by measuring a different majority of sales-transaction records. If so, subroutine 500 loops back to block 510. Otherwise, subroutine 500 proceeds to ending block 599. In various embodiments, subroutine 500 may be configured to iterate for a predetermined count (e.g., ten times) to achieve a desired degree of confidence in the statistical accuracy measurement.

Subroutine 500 ends in ending block 599, returning the statistical accuracy data structure to the caller.

Figure 6:
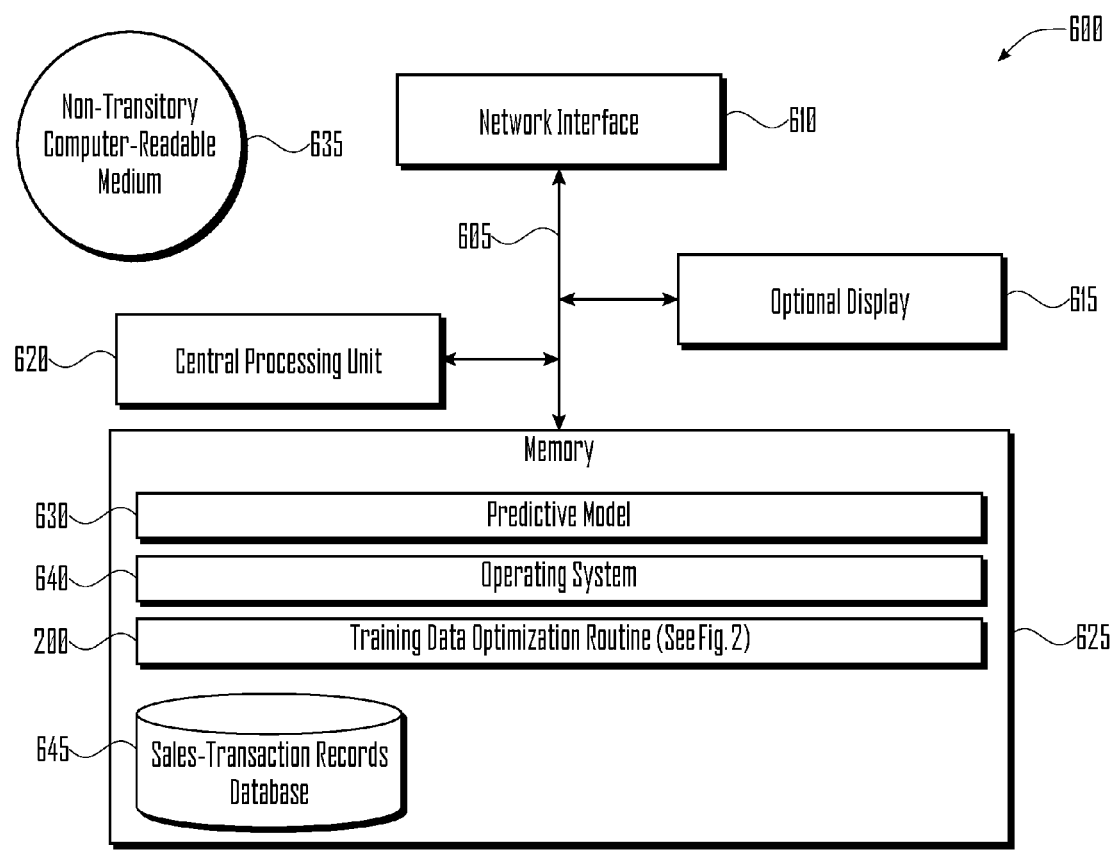
FIG. 6 illustrates several components of an exemplary training-data-optimization server in accordance with one embodiment.

FIG. 6 illustrates several components of an exemplary training-data-optimization server in accordance with one embodiment. In some embodiments, training-data-optimization server 600 may include many more components than those shown in FIG. 6. However, it is not necessary that all of these generally conventional components be shown in order to disclose an illustrative embodiment.

In various embodiments, training-data-optimization server 600 may comprise one or more physical and/or logical devices that collectively provide the functionalities described herein. In some embodiments, training-data-optimization server 600 may comprise one or more replicated and/or distributed physical or logical devices.

In some embodiments, training-data-optimization server 600 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Training-data-optimization server 600 includes a bus 605 interconnecting several components including a network interface 610, an optional display 615, a central processing unit 620, and a memory 625.

Memory 625 generally comprises a random access memory ("RAM"), a read only memory ("ROM"), and a permanent non-transitory mass storage device, such as a hard disk drive or solid-state drive. The memory 625 stores program code for a routine 200 for optimizing training data for developing a predictive model to automatically value a subject real-estate property (see FIG. 2, discussed below). In addition, the memory 625 also stores a predictive model 630 and an Operating system 640

Predictive model 630 is a mathematical predictive model such as may be used by an AVM service to provide real estate property value predictions. In various embodiments, predictive model 630 may include a regression model, an adaptive estimation model, a neural network model, or the like.

To provide a property-value prediction, predictive model 630 is typically developed according to a set of training data including sales-transaction records describing values of other properties, typically including sales data from recent property sales within a geographic region. Some predictive models may also take into account additional data, such as previous surveyor and/or assessor valuations, historical house price movements, user inputs (e.g., number of bedrooms, property improvements, etc.), and the like.

These and other software components may be loaded into memory 625 of training-data-optimization server 600 using a drive mechanism (not shown) associated with a non-transitory computer-readable medium 635, such as a floppy disc, tape, DVD/CD-ROM drive, memory card, or the like.

Memory 625 also includes sales-transaction records database 645. In some embodiments, training-data-optimization server 600 may communicate with sales-transaction records database 645 via network interface 610, a storage area network ("SAN"), a high-speed serial bus, and/or via the other suitable communication technology.

In some embodiments, sales-transaction records database 645 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

In some embodiments, sales-transaction records database 645 may include a spatial index or other optimizations to enable it to store information related to describing an object's position in geographic space, support geographic/spatial queries, and/or otherwise act as a geographic/spatial database.

Although specific embodiments have been illustrated and described herein, it will be appreciated by those of ordinary skill in the art that alternate and/or equivalent implementations may be substituted for the specific embodiments shown and described without departing from the scope of the present disclosure. For example, while various examples are discussed herein that use two search dimensions, similar systems and methods may be expanded to consider candidate points within a search space having three or more search dimensions. This application is intended to cover any adaptations or variations of the embodiments discussed herein.

The invention claimed is:

1. A server-device-implemented method for optimizing training data for developing a predictive model to automatically value a subject real-estate property, the method comprising:
   obtaining, by one or more server devices, an indication to provide an automated value prediction for the subject real-estate property as of an effective date;
   in response to obtaining said indication, defining, by said server device, a search space having multiple dimensions, each corresponding to a range of candidate values for a search criterion for selecting subsets of a multiplicity of sales-transaction records, said multiple dimensions including at least a temporal dimension that measures distance in time before the effective date, and a geographic dimension that measures distance in space away from the subject real-estate property;
   evaluating, by said one or more server devices, a multiplicity of points within said multi-dimension search space, said multiplicity of points varying along at least said temporal dimension and said geographic dimension;
   selecting, by said one or more server devices based at least in part on evaluating said multiplicity of points within said multi-dimension search space, a first majority subset of said multiplicity of sales-transaction records as a first statistical accuracy data structure according to a first search criteria set;
   developing, by said one or more server devices, the predictive model according to said first majority subset of said multiplicity of sales-transaction records;
   obtaining, by said one or more server devices, a first statistical measure of the predictive model applied to said first majority subset of said multiplicity of sales-transaction records;
   selecting, by said one or more server devices based at least in part on evaluating said multiplicity of points within said multi-dimension search space, a second majority subset of said multiplicity of sales-transaction records as a second statistical accuracy data structure according to a second search criteria set;
   developing, by said one or more server devices, the predictive model according to said second majority subset of said multiplicity of sales-transaction records;
   obtaining, by said one or more server devices, a second statistical measure of the predictive model applied to said second majority subset of said multiplicity of sales-transaction records;
   determining that the second statistical measure of the predictive model applied to said second majority subset of said multiplicity of sales-transaction records indicates greater accuracy than the first statistical measure of the predictive model applied to said first majority subset of said multiplicity of sales-transaction records; and
   developing, by said one or more server devices in response to said greater accuracy, the predictive model according to said second subset of said multiplicity of sales-transaction records to generate said automated value prediction for the subject real-estate property as of the effective date.

2. The method of claim 1, wherein defining said multi-dimension search space comprises:
   sampling a temporal range to obtain a plurality of candidate temporal-distance values; and
   sampling a geographic range to obtain a plurality of candidate geographic-distance values.

3. The method of claim 2, wherein evaluating a candidate point of said multiplicity of points comprises:
   determining said first search criteria set comprising a candidate temporal-distance value selected from said plurality of candidate temporal-distance values and a candidate geographic-distance value selected from said plurality of candidate geographic-distance values;
   selecting said first majority subset of said multiplicity of sales-transaction records corresponding to said first search criteria set;
   developing the predictive model according to at least said first majority subset of sales-transaction records; and
   statistically measuring a first accuracy of the predictive model thereby developed, said first accuracy being less than the greater accuracy indicated by the second statistical measure of the predictive model applied to said second majority subset of said multiplicity of sales-transaction records.

4. The method of claim 1, wherein said first and second statistical measure each comprises a forecast standard deviation statistical measure.

5. The method of claim 1, wherein said first and second statistical measure each is selected from a group consisting of:
   a mean average percent error statistical measure;
   a mean absolute error statistical measure; and
   a root mean square error statistical measure.

6. The method of claim 1, wherein the predictive model is selected from a group consisting of:
   a regression model;
   an adaptive estimation model; and
   a neural network model.

7. A computing apparatus for optimizing training data for developing a predictive model to automatically value a subject real-estate property, the apparatus comprising a processor and a memory storing instructions that, when executed by the processor, configure the apparatus to:
   obtain an indication to provide an automated value prediction for the subject real-estate property as of an effective date;
   in response to obtaining said indication, define a search space having multiple dimensions, each corresponding to a range of candidate values for a search criterion for selecting subsets of a multiplicity of sales-transaction records, said multiple dimensions including at least a temporal dimension that measures distance in time before the effective date, and a geographic dimension that measures distance in space away from the subject real-estate property;

evaluate a multiplicity of points within said multi-dimension search space, said multiplicity of points varying along at least said temporal dimension and said geographic dimension;

select, based at least in part on evaluating said multiplicity of points within said multi-dimension search space, a first majority subset of said multiplicity of sales-transaction records as a first statistical accuracy data structure according to a first search criteria set;

develop, by said one or more server devices, the predictive model according to said first majority subset of said multiplicity of sales-transaction records;

obtain, by said one or more server devices, a first statistical measure of the predictive model applied to said first majority subset of said multiplicity of sales-transaction records;

select, by said one or more server devices based at least in part on evaluating said multiplicity of points within said multi-dimension search space, a second majority subset of said multiplicity of sales-transaction records as a second statistical accuracy data structure according to a second search criteria set;

develop, by said one or more server devices, the predictive model according to said second majority subset of said multiplicity of sales-transaction records;

obtain, by said one or more server devices, a second statistical measure of the predictive model applied to said second majority subset of said multiplicity of sales-transaction records;

determine that the second statistical measure of the predictive model applied to said second majority subset of said multiplicity of sales-transaction records indicates greater accuracy than the first statistical measure of the predictive model applied to said first majority subset of said multiplicity of sales-transaction records; and develop, in response to said greater accuracy, the predictive model according to said second subset of said multiplicity of sales-transaction records to generate said automated value prediction for the subject real-estate property as of the effective date.

8. The apparatus of claim 7, wherein the instructions that configure the apparatus to define said multi-dimension search space further comprise instructions configuring the apparatus to:
sample a temporal range to obtain a plurality of candidate temporal-distance values; and
sample a geographic range to obtain a plurality of candidate geographic-distance values.

9. The apparatus of claim 8, wherein evaluating a candidate point of said multiplicity of points comprises:
determine a multi-dimension search criteria set comprising a candidate temporal-distance value selected from said plurality of candidate temporal-distance values and a candidate geographic-distance value selected from said plurality of candidate geographic-distance values;
select a distinct subset of said multiplicity of sales-transaction records corresponding to said multi-dimension search criteria set;
develop the predictive model according to at least a majority of said distinct subset of sales-transaction records; and
statistically measure an accuracy of the predictive model thereby developed.

10. The apparatus of claim 7, wherein the instructions that configure the apparatus to said first and second statistical measure further comprise instructions configuring the apparatus to a forecast standard deviation statistical measure.

11. The apparatus of claim 7, wherein said first and second statistical measure each is selected from a group consisting of:
a mean average percent error statistical measure;
a mean absolute error statistical measure; and
a root mean square error statistical measure.

12. The apparatus of claim 7, wherein the predictive model is selected from a group consisting of:
a regression model;
an adaptive estimation model; and
a neural network model.

13. A non-transitory computer-readable storage medium having stored thereon instructions that, when executed by a processor, configure the processor to:
obtain an indication to provide an automated value prediction for a subject real-estate property as of an effective date;
in response to obtaining said indication, define a search space having multiple dimensions, each corresponding to a range of candidate values for a search criterion for selecting subsets of a multiplicity of sales-transaction records, said multiple dimensions including at least a temporal dimension that measures distance in time before the effective date, and a geographic dimension that measures distance in space away from the subject real-estate property;
evaluate a multiplicity of points within said multi-dimension search space, said multiplicity of points varying along at least said temporal dimension and said geographic dimension;
select, based at least in part on evaluating said multiplicity of points within said multi-dimension search space, a first majority subset of said multiplicity of sales-transaction records as a first statistical accuracy data structure according to a first search criteria set;
develop, by said one or more server devices, the predictive model according to said first majority subset of said multiplicity of sales-transaction records;
obtain, by said one or more server devices, a first statistical measure of the predictive model applied to said first majority subset of said multiplicity of sales-transaction records;
select, by said one or more server devices based at least in part on evaluating said multiplicity of points within said multi-dimension search space, a second majority subset of said multiplicity of sales-transaction records as a second statistical accuracy data structure according to a second search criteria set;
develop, by said one or more server devices, the predictive model according to said second majority subset of said multiplicity of sales-transaction records;
obtain, by said one or more server devices, a second statistical measure of the predictive model applied to said second majority subset of said multiplicity of sales-transaction records;
determine that the second statistical measure of the predictive model applied to said second majority subset of said multiplicity of sales-transaction records indicates greater accuracy than the first statistical measure of the predictive model applied to said first majority subset of said multiplicity of sales-transaction records; and develop, in response to said greater accuracy, the predictive model according to said second subset of said multiplicity of sales-transaction records to generate said automated value prediction for the subject real-estate property as of the effective date.

14. The non-transitory computer-readable storage medium of claim 13, wherein defining said multi-dimension search space comprises:
sample a temporal range to obtain a plurality of candidate temporal-distance values; and
sample a geographic range to obtain a plurality of candidate geographic-distance values.

15. The non-transitory computer-readable storage medium of claim 14, wherein evaluating a candidate point of said multiplicity of points comprises:
determine a multi-dimension search criteria set comprising a candidate temporal-distance value selected from said plurality of candidate temporal-distance values and a candidate geographic-distance value selected from said plurality of candidate geographic-distance values;
select a distinct subset of said multiplicity of sales-transaction records corresponding to said multi-dimension search criteria set;
develop the predictive model according to at least a majority of said distinct subset of sales-transaction records; and
statistically measure an accuracy of the predictive model thereby developed.

16. The non-transitory computer-readable storage medium of claim 13, wherein said first and second statistical measure each comprises a forecast standard deviation statistical measure.

17. The non-transitory computer-readable storage medium of claim 13, wherein said first and second statistical measure each is selected from a group consisting of:
a mean average percent error statistical measure;
a mean absolute error statistical measure; and
a root mean square error statistical measure.

18. The non-transitory computer-readable storage medium of claim 13, wherein the predictive model is selected from a group consisting of:
a regression model;
an adaptive estimation model; and
a neural network model.

* * * * *